United States Patent [19]
Müller et al.

[11] Patent Number: 5,936,018
[45] Date of Patent: Aug. 10, 1999

[54] MELT-PROCESSABLE POLYURETHANES CONTAINING SPECIAL WAX MIXTURES

[75] Inventors: Friedemann Müller, Neuss; Wolfgang Bräuer, Leverkusen; Herbert Heidingsfeld, Frechen; Hans-Georg Hoppe, Leichlingen; Willi Meister, Dormagen; Jürgen Winkler, Langenfeld; Karl-Heinz Wolf, Köln; Hans-Georg Wussow, Düsseldorf, all of Germany

[73] Assignee: Bayer Aktiengesellschaft, Leverkusen, Germany

[21] Appl. No.: 08/974,548

[22] Filed: Nov. 19, 1997

[30] Foreign Application Priority Data

Nov. 28, 1996 [DE] Germany .................. 196 49 290

[51] Int. Cl.[6] .................. C08J 3/00; C08K 3/20; C08L 75/00; C08G 18/00
[52] U.S. Cl. .................. 524/318; 524/590; 528/44
[58] Field of Search .................. 524/318, 590; 528/44

[56] References Cited

U.S. PATENT DOCUMENTS

| | | | |
|---|---|---|---|
| 4,581,387 | 4/1986 | Werner et al. | 521/128 |
| 4,822,836 | 4/1989 | Wroczynski | 524/139 |
| 4,877,856 | 10/1989 | Hall et al. | 528/44.79 |
| 5,344,853 | 9/1994 | Knipp et al. | 521/128 |
| 5,567,791 | 10/1996 | Brauer et al. | 528/52 |

FOREIGN PATENT DOCUMENTS 5163431  6/1993  Japan .

OTHER PUBLICATIONS

R. Gächter, H. Müller (eds): Taschenbuch der Kunststoff–Additive, 3rd edition, Hanser Verlag, Munich, (month unavailable) 1989, p. 443 et.
Patent Abstracts of Japan, vol. 015, No. 398, Oct. 9, 1991, & JP 03 163127 A (Sumitomo Bayer Urethane KK), Jul. 15, 1991.
Patent Abstracts of Japan, vol. 015, No. 027, Jan. 22, 1991, & JP 02 265964 A (Dynic Corp.), Oct. 30, 1990.

*Primary Examiner*—Patrick D. Niland
*Attorney, Agent, or Firm*—Joseph C. Gil; Aron Preis

[57] ABSTRACT

A thermoplastic molding composition comprising a thermoplastic polyurethane and a wax mixture is disclosed. The polyurethane is a product of an organic diisocyanate, a linear, hydroxyl-terminated polyol and a diol or diamine chain extender. The wax mixture contains a first mixture of an ester of a $C_{10-45}$ aliphatic carboxylic acid and a diol, and an alkali metal or alkaline earth metal salt of a $C_{10-45}$ aliphatic carboxylic acids, and at least one member selected from the group consisting of fatty acid ester, fatty acid amide, fatty acid ester amide and polyethylene wax.

8 Claims, No Drawings

MELT-PROCESSABLE POLYURETHANES CONTAINING SPECIAL WAX MIXTURES

This invention relates to melt-processable polyurethanes containing special wax mixtures, to films, sheets, injection moldings and fibers produced therefrom and to a process for the continuous production of these melt-processable polyurethanes.

Thermoplastic polyurethane elastomers (TPU) are industrially significant because they exhibit excellent mechanical properties and are melt-processable at low cost. By using different chemical components for synthesis, their mechanical properties may be varied over a wide range. A summary description of TPU and the properties and applications thereof may be found in Kunststoffe 68 (1978) 819 or Kautschuk, Gummi, Kunststoffe 35 (1982) 568.

TPU are synthesized from linear polyols, usually polyester or polyether polyols, organic diisocyanates and short-chain diols (chain extenders). According to the prior art, catalysts may additionally be used to accelerate the formation reaction. Properties may be adjusted by varying the molar ratios of the synthesis components over a wide range. Molar ratios of polyols to chain extenders of 1:1 to 1:12 have proved successful. In this manner, products of a hardness ranging from 70 Shore A to 75 Shore D are obtained. TPU may be synthesized either in stages (prepolymer process) or by simultaneously reacting all the components in one stage (one-shot process). In the prepolymer process, a prepolymer containing isocyanate is formed from the polyol and the diisocyanate, which prepolymer is reacted with the chain extender in a second stage. The TPU may be produced continuously or batch-wise. The best known industrial production processes are the belt process and the extruder process.

In addition to catalysts, auxiliary substances and additives may also be added to the TPU components. One example which may be mentioned is waxes, which perform important tasks during both the industrial production of the TPU and the processing thereof The wax acts as a friction-reducing internal and external lubricant, so improving the TPU's flow characteristics. It is additionally useful as a release agent, preventing the TPU from adhering to the surrounding material (for example the mould) and as a dispersant for other additives, for example pigments and antiblocking agents.

The waxes used according to the prior art are, for example, fatty acid esters, such as stearic acid esters and montanic acid esters as well as the metal soaps thereof, together with fatty acid amides such as stearylamide and oleic acid amide, or also polyethylene waxes. A review of the waxes used in thermoplastics may be found in R. Gachter, H. Muller (eds.): Taschenbuch der Kunststoffadditive, 3rd edition, Hanser Verlag, Munich 1989, pp. 443 et seq.

For reason of chemical reactivity and the particular processing and service temperatures for TPU, many of the above-stated waxes are not suitable for use in TPU. As a consequence, it is essentially amnide waxes having good release action which have hitherto been used, in particular ethylene bis-stearylamide. Montanic ester waxes exhibiting good lubricant characteristics combined with low volatility are additionally used (EPA 308,683; EPA 670,339; JP 05-163-431). One disadvantage of amide waxes when they are used in TPU is, however, their tendency to migrate. After a certain time, this results in the formation of a surface deposit on the article, which brings about unwanted change in surface-dependent characteristics and also degrades optical properties, especially for thin-wall applications such as films. The use of montanic ester waxes is restricted by low haze limits. In addition to release action which is only satisfactory, they also have a distinct tendency to migrate.

It has now been found that the problems caused by migration of the mould release agent may be avoided by the incorporation in the TPU of a special wax mixture.

The present invention accordingly provides melt-processable polyurethanes composition containing TPU and a wax mixture. The TPU is produced by reacting the polyurethane-forming components A) organic diisocyanate, B) linear, hydroxyl-terminated polyol having a number average molecular weight of 500 to 5000, C) diol or diamine chain extender having a formula molecular weight of 60 to 500, wherein the molar ratio of NCO groups in A) to the isocyanate-reactive groups in B) and C) is 0.9 to 1.2.

The wax mixture contains 0.02 to 0.8 percent of component (a) and 0.1 to 2 percent of component (b), the percents being relative to the weight of the composition, where (a) denotes a mixture of about 20 to 95%, relative to the weight of the mixture, of an ester of a $C_{10-45}$ aliphatic carboxylic acid and a diol, and about 5 to 80%, relative to the weight of the mixture, of an alkali metal or alkaline earth metal salt of said $C_{10-45}$ aliphatic carboxylic acid, and (b) denotes at least one member selected from the group consisting of fatty acid esters, fatty acid amides, fatty acid ester amides and polyethylene waxes, with the proviso that component (b) does not contain the ester of component (a).

Suitable organic diisocyanates, A), are aliphatic, cycloaliphatic, araliphatic, heterocyclic and aromatic diisocyanates, as are described, for example, in Justus Liebigs Annalen der Chemie, 562 (1949) 75.

Specifically, the following may be mentioned by way of example: aliphatic diisocyanates such as hexamethylene diisocyanate; cyclo-aliphatic diisocyanates such as isophorone diisocyanate, 1,4-cyclohexane dilsocyanate, 1-methyl-2,4-cyclohexane diisocyanate and 1-methyl-2,6-cyclohexane diisocyanate as well as the corresponding isomer mixtures, 4,4'-dicyclohexylmethane diisocyanate, 2,4'-dicyclohexylmethane diisocyanate and 2,2'-dicyclohexylmethane diisocyanate as well as the corresponding isomer mixtures; aromatic diisocyanates such as 2,4-tolylene diisocyanate, mixtures of 2,4-tolylene diisocyanate and 2,6-tolylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and 2,4'-diphenylmethane diisocyanates, 4,4'-disocyanatodiphenyl-1,2-ethane and 1,5-napthylene diisocyanate. Preferably used diisocyanates are 1,6-hexamethylene dilsocyanate, isophorone diisocyanate, dicyclo-hexylmethane dilsocyanate, diphenylmethane diisocyanate isomer mixtures having a 4,4'-dicyclohexylmethane dilsocyanate content of greater than 96 wt. % and in particular 4,4'-diphenylmethane diisocyanate and 1,5-naphthylene diisocyanate. The stated diisocyanates may be used individually or as mixtures with each other. They may also be used together with up to 15 wt. % (calculated relative to the total quantity of diisocyanate) of a polyisocyanate, for example 4,4',4"-triphenylmethane triisocyanate and poly-phenylpolymethylene polyisocyanates.

Linear, hydroxyl-terminated polyols having a number average molecular weight of 500 to 5000 are suitable as component B). As a consequence of the production process, these often contain small quantities (<5 wt. %)of non-linear compounds. They are thus often also referred to as "substantially linear polyols". Polyester, polyether, polycarbonate diols or mixtures of these are preferred.

Suitable polyether diols may be produced by reacting one or more alkylene oxides having 2 to 4 carbon atoms in the alkylene residue with a starter molecule containing two attached active hydrogen atoms. Alkylene oxides which, for example, may be mentioned are: ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are preferably used. The alkylene oxides may be used individually, alternately in succession or as mixtures. Starter molecules which may be considered are, for example: water, aminoalcohols, such as N-alkyldiethanolamines, for example N-methyl-diethanolamine and diols, such as ethylene glycol, 1,3-propylene glycol, 1,4-butanediol and 1,6-hexanediol. Mixtures of starter molecules may also optionally be used. Suitable polyether diols are also tetrahydrofuran polymerization products containing hydroxyl groups. Trifunctional polyethers may also be used in proportions of 0 to 30 wt. %, relative to the difunctional polyethers.

The substantially linear polyether diols may be used both individually and as mixtures with each other.

Suitable polyester diols may he produced, for example, from dicarboxylic acids having 2 to 12 carbon atoms, preferably 4 to 6 carbon atoms and polyhydric alcohols. Dicarboxylic acids which may, for example, be considered are: aliphatic dicarboxylic acids such as succinic acid, glutaric acid, adipic acid, suberic acid, azelaic acid and sebacic acid; as may also aromatic dicarboxylic acids, such as phthalic acid, isophthalic acid and terephthalic acid. The dicarboxylic acids may be used individually or as mixtures, for examples as a succinic, glutaric and adipic acid mixture. When producing the polyester diols, it may optionally be advantageous to replace the dicarboxylic acids with the corresponding dicarboxylic acid derivatives, such as carboxylic acid diesters having 1 to 4 carbon atoms in the alcohol residue, carboxylic anhydrides or carboxylic acid chlorides. Examples of polyhydric alcohols are glycols having 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending upon the properties desired, the polyhydric alcohols may be used alone or optionally mixed together. Carbonic acid esters with the stated diols are also suitable, in particular those having 4 to 6 carbon atoms, such as 1,4-butanediol or 1,6-hexanediol, condensation products of w-hydroxycarboxylic acids, for example w-hydroxycaproic acid and preferably polymerization products of lactones, for example optionally substituted w-caprolactones. Preferably used polyester diols are ethanediol polyadipates, 1,4-butanediol polyadipates, ethanediol/1,4-butanediol polyadipates, 1,6-hexanediol/neopentyl glycol polyadipates, 1,6-hexanediol/1,4-butanediol polyadipates and polycaprolactones. The polyester diols may be used individually or as mixtures with each other.

Suitable chain extenders, C), are diols or diamines having a formula molecular weight of 60 to 500, preferably aliphatic diols having 2 to 14 carbon atoms, such as for example ethanediol, 1,6-hexanediol, diethylene glycol, dipropylene glycol and in particular 1,4-butanediol. Further suitable are diesters of terephthalic acid with glycols having 2 to 4 carbon atoms, such as for example terephthalic acid bis-ethylene (glycol or terephthalic acid bis-1,4-butanediol, hydroxyalkylene ethers of hydroquinone, such as for example 1,4-di(b-hydroxy-ethyl)hydroquinone, ethoxylated bisphenols, (cyclo)aliphatic diamines, such as for example isophoronediamine, ethylenediamine, 1,2-propylenediamine, 1,3-propylenediamine, N-methyl-1,3-propylenediamine, N,N'-dimethylethylene-diamine and aromatic diamines, such as for example 2,4-tolylenediamine and 2,6-tolylene-diamine, 3,5-diethyl-2,4-tolylenediamine and 3,5-diethyl-2,6-tolylene-diamine and primary ortho-, di-, tri- or tetraalkyl-substituted 4,4'-diaminodiphenylmethanes. Mixtures of the above-stated chain extenders may also be used. Relatively small quantities (<5 wt. %)of triols may also be added.

Conventional additives, including monofunctional compounds useful as chain terminators, and mould release auxiliaries may be added in functionally effective amounts. Examples include alcohols such as octanol and stearyl alcohol and amines such as butylamine and stearylamine.

The TPU may be produced by reacting the synthesis components, optionally in the presence of catalysts, auxiliary substances and additives, in quantities such that the equivalent ratio of NCO groups to the total of NCO-reactive groups, in particular the OH groups of the low molecular weight diols/triols and polyols is 0.9:1.0 to 1.2:1.0, preferably 0.95:1.0 to 1.10:1.0.

According to the invention, the composition comprise TPU and a wax mixture. The wax mixture contains 0.02 to 0.8 percent of component (a) and 0.1 to 2 percent of component (b), the percents being relative to the weight of the composition. Component (a) is a mixture of about 20 to 95%, relative to the weight of the mixture, of an ester of a $C_{10-45}$ aliphatic carboxylic acid and a diol, and about 5 to 80%, relative to the weight of the mixture, of an alkali metal or alkaline earth metal salt of said $C_{10-45}$ aliphatic carboxylic acid. Component (b) is at least one member selected from the group consisting of fatty acid esters, fatty acid amides, fatty acid ester amides and polyethylene waxes. In case component (b) contains fatty acid esters, these may not be identical to the ester of component (a).

A characterizing feature of component (a) is that both the carboxylic acid ester and the metal salt are based on a carboxylic acid. Examples of substances used according to the invention are the esters and salts of oleic acid, palmitic acid, stearyl acid, montanic acid, erucic acid or cerotic acid. These are esterified, for example, with ethylene glycol, propylene glycol, butanediol, pentanediol, hexanediol, diethylene glycol or dipropylene glycol. The carboxylic acid salt is produced, for example, by reaction with the hydroxides of sodium, potassium, magnesium or calcium. Component (a) according to the invention may contain both of the mixtures of esters and carboxylates of different carboxylic acids and of the mixtures of esters and carboxylates of the same carboxylic acid. The latter may be produced, for example, by saponifying an only partially esterified carboxylic acid. A mixture of montanic acid esterified with butanediol and calcium montanate is preferably used.

The wax mixture according to the invention additionally contains 0.1 to 2 wt. %, relative to the entire quantity of composition, of at least one of the compounds included in component (b). These include fatty acid esters such as stearic acid esters and montanic acid esters, fatty acid amides such as stearyl amides and oleic acid amides, fatty acid ester amides such as stearic acid amide alkyl stearates, and polyethylene waxes. Mixtures of these components may also be used. Montanic acid esters and stearylamides are preferably used, in particular montanic acid ethyl ester and bis-ethylenestearylamide.

Catalysts suitable for the production of the TPU according to the invention are known in principle. Suitable catalysts are, for example, tertiary amines such as triethylamine, dimethylcyclohexylamine, N-methylmorpholine, N,N'-dimethylpiperazine, 2-(dimethylaminoethoxy)-ethanol, diazabicyclo[2.2.2]octane, as well as organometallic compounds such as titanic acid esters, organic iron or tin compounds. Examples are tin diacetate, tin dioctoate, tin dilaurate or also the dialkyltin salts of aliphatic carboxylic acids such as dibutyltin diacetate and dibutyltin dilaurate or the like. Organometallic compounds are the preferred catalysts, in particular titanic acid esters and organic iron or tin compounds.

The composition of the invention may contain other auxiliary substances and additives such as are silicone compounds, antiblocking agents, inhibitors, stabilizers a(gainst hydrolysis, light, heat and discoloration, flame retardants, dyes, pigments, inorganic or organic fillers and reinforcing materials. Reinforcing materials are, in particular, fibrous reinforcing materials, for example inorganic fibers produced using processes known in principle, which may also he provided with a size. Further details relating to the stated auxiliary substances and additives may be found, for example in I. H. Saunders, K. C. Frisch, High Polymers, volume XVI, Polyurethane, parts 1 and 2, Interscience Publishers 1962 and 1964 respectively, or R. G ächter, H. Müller (eds.), Taschenbuch für Kunststoff-Additive, 3rd edition, Hanser Verlag, Munich 1989 or in DE-A29 01 774.

Optionally incorporated in the inventive composition are thermoplastics, for example polycarbonates and acrylonitrile/butadiene/ styrene terpolymers, in particular ABS. Other elastomers such as rubber, ethylene/vinyl acetate copolymers, styrene/ butadiene copolymers as well as other TPU may, however, also be used.

Conventional commercial plasticizers such as phosphates, phthalates, adipates, sebacates and alkylsulphonic acid esters may also be incorporated.

The present invention also provides processes for the production of the TPU according to the invention.

These processes may proceed continuously in the so-called extruder process, for example in a multi-screw extruder. The TPU components A), B) and C) may be apportioned simultaneously, i. e. using the one-shot process, or in succession, i.e. using a prepolymer process. The prepolymer may here both be introduced in batches or also continuously produced in one section of the extruder or in a separate, upstream prepolymer unit.

The waxes according to the invention may be apportioned continuously to the TPU reaction in the extruder, preferably into the first extruder barrel section. The waxes are apportioned either at room temperature in a solid, aggregated state or in liquid form at 70 to 160° C.

It is, however, also possible to apportion the waxes according to the invention into previously produced PU which has been remelted in an extruder and to compound them. In another variant, it is, however, also possible to mix them homogeneously into the initial quantity of polyol before the reaction and to apportion them into the reaction with the polyol.

The present invention also provides the use of wax mixtures prepared from a) $1 \geq y \geq 88\%$, relative to the weight of the wax mixture, of a first mixture of $95\% \geq x \geq 20\%$, relative to the weight of said first mixture of aliphatic carboxylic acids having 10 to 45 carbon atoms esterified with a diol and $(100-x)\%$, relative to the weight of said first mixture, of alkali metal or alkaline earth metal salts of said aliphatic carboxylic acid having 10 to 45 carbon atoms, and b) $(100-y)\%$ relative to the weight of the wax mixture, of at least one member selected from the group consisting of fatty acid esters, fatty acid amides, fatty acid ester amides or polyethylene waxes, with the proviso that component (b) does not contain the esters of component (a).

in melt-processable polyurethanes.

The TPU products obtained in this manner have good mechanical and elastic characteristics. They additionally have excellent processability. Highly homogeneous films, sheets or fibers may be produced from melts thereof The films and sheets, which preferably exhibit hardness values of 65 to 95 Shore A, have good release performance due to their low tendency to stick. Since no surface deposit is formed by migration of the waxes according to the invention onto the surface, optical properties and surface characteristics are not impaired even over extended periods of storage. The low migration tendency is also noticeable when producing injection molded articles.

As with the films and sheets, no surface deposit is formed even after an extended period of storage.

EXAMPLES

TPU Formulation: (pbw denotes parts by weight)
Poly-1,4-butanediol adipate (molecular weight approx. 2200): 100 pbw
Butanediol: 11 pbw
Diphenylmethane diisocyanate (liquid MDI, 50° C.): 42 pbw
Tin dioctoate: 150 ppm
TPU Production Process:

Continuous TPU reaction in mixed tubular mixer/extruder (ZSK 83, from Werner & Pfleiderer) using the known prepolymer process (EPA 571 830 and EP-A 571 828). The barrel temperatures of the 13 barrel sections are 100° C. to 220° C. The rotational speed of the screw is set to 300 rpm. The total feed rate is 500 kg/h. The TPU is extruded as a melt strand, cooled in water and pelletized.

Apportionment of wax

The wax mixture, or its components, were apportioned continuously as noted in Table 1:

In Example 5 (marked "Reaction") the components were apportioned during the above-stated TPU production process into the first extruder barrel section.

In the remaining examples, the components were apportioned into barrel section I of a ZSK 83 extruder during re-extrusion of the TPU pellets produced using the above-described process. The barrel temperatures are 200° C. to 220° C.; the rotational speed of the screw is 100 rpm. The TPU is extruded as a melt strand, cooled in water and pelletized.

Blown film production

The pellets of the inventive composition are melted in a single-screw extruder (Plasticorder PL 2000-6 30/25D single-screw extruder from Brabender) (feed rate 3kg/h; 185–205° C.) and extruded through a blown film head to form a tubular film.

Production of injection molded sheets

The pellets of the inventive composition are melted in an injection molding machine (32 screw, D60 injection molding machine, Mannesmann AG) (melt temperature approx. 225° C.) and shaped into sheets (mould temperature 40° C.; sheet dimensions 125×45×2 mm).

The most important characteristics of the resultant moldings are shown in Tables 1 and 2.

TABLE 1

Film assessment

| Examples | Apportionment of wax | Component (a) | wt. % | Component (b) | wt. % | Formation of surface deposit on film after 6 months' storage |
|---|---|---|---|---|---|---|
| 1 | Re-extrusion | — | — | 1 | 0.14 | severe |
| 2 | Re-extrusion | 2 | 0.06 | 1 | 0.14 | no |
| 3 | Re-extrusion | 2 | 0.25 | 1 | 0.14 | no |
| 4 | Re-extrusion | 2 | 0.50 | 1 | 0.14 | slight |
| 5 | Reaction | 2 | 0.10 | 1 | 0.70 | no |
| 6 | Re-extrusion | — | — | 3 | 0.14 | some |
| 7 | Re-extrusion | 2 | 0.30 | 3 | 0.30 | no |

Examples 1 and 6 = Comparative Examples not according to the invention.
Wax 1 = ethylene bis-stearylamide (Höchstwachs C)
Wax 2 = butyl montanate/calcium montanate mixture (Höchstwachs OP)
Wax 3 = ethyl montanate (Höchstwachs E)

Films containing the wax mixture according to the invention do not form any discernible surface deposit even after an extended period The optical properties of the film and the surface characteristics, such as for example adhesion to other polymers on coating, are thus not impaired.

TABLE 2

Exudation test for injection molded sheet storage at 80° C.

| | Formation of surface deposit: | | |
|---|---|---|---|
| Example | immediately | after 1 week | after 4 weeks |
| 5 | no | no | no |

The injection molded sheets produced with the wax mixture according to the invention exhibit no surface deposit even after 4 weeks' storage at 80° C., Although the invention has been described in detail in the foregoing for the purpose of illustration, it is to be understood that such detail is solely for that purpose and that variations can be made therein by those skilled in the art without departing from the spirit and scope of the invention except as it may be limited by the claims

What is claimed is:

1. A thermoplastic molding composition comprising a thermoplastic polyurethane and a wax mixture wherein polyurethane is a product of
    (A) an organic diisocyanate (B) a linear, hydroxyl-terminated polyol having a number average molecular weight of 500 to 5000 and (C) a diol or diamine chain extender having a formula molecular weight of 60 to 500, wherein molar ratio of NCO groups in said (A) to the total isocyanate-reactive groups in (B) and (C) is 0.9 to 1.2, and wherein wax mixture contains 0.02 to 0.8 percent of component (a) and 0.1 to 2 percent of component (b), the percents being relative to the weight of the composition, said (a) denotes a first mixture of about 20 to 95%, relative to the weight of the mixture, of an ester of a $C_{10-45}$ aliphatic carboxylic acid and a diol, and about 5 to 80%, relative to the weight of said first mixture, of an alkali metal or alkaline earth metal salt of said $C_{10-45}$ aliphatic carboxylic acid, and said (b) denotes at least one member selected from the group consisting of fatty acid esters, fatty acid amides, fatty acid ester amides and polyethylene waxes, with the proviso that component (b) does not contain the ester of component (a).

2. The composition of claim 1 wherein said (a) contains an ester of montanic acid with butylene glycol and calcium montanate.

3. The composition of claim 1 wherein said (b) is bis-ethylene stearylamide.

4. The composition of claim 2 wherein said (b) is an ester of montanic acid with ethylene glycol.

5. An article of manufacture comprising the composition of claim 1.

6. A process for the continuous production of the composition of claim 1 comprising apportioning said component (a) and component (b) into an extruder together with said (A), (B) and (C).

7. A method of using a wax mixture containing
    a) $1 \geq y \geq 88\%$, relative to the weight of the wax mixture, of a first mixture of $95\% \geq x \geq 20\%$, relative to the weight of said first mixture of aliphatic carboxylic acids having 10 to 45 carbon atoms esterified with a diol and (100–x)%, relative to the weight of said first mixture, of alkali metal or alkaline earth metal salts of said aliphatic carboxylic acids having 10 to 45 carbon atoms, and
    b) (100–y)% relative to the weight of the wax mixture, of at least one member selected from the group consisting of fatty acid esters, fatty acid amides, fatty acid ester amides or polyethylene waxes, with the proviso that component (b) does not contain the esters of component (a),
comprising introducing said mixture into a melt-processable polyurethanes to form a blend.

8. A thermoplastic molding composition comprising a thermoplastic polyurethane and a wax mixture wherein polyurethane is a product of (A) an organic diisocyanate (B) a linear, hydroxyl-terminated polyol having a number average molecular weight of 500 to 5000 and (C) $C_{2-14}$-aliphatic diol or diamine chain extender having a formula molecular weight of 60 to 500, wherein molar ratio of NCO groups in said (A) to the total isocyanate-reactive groups in (B) and (C) is 0.9 to 1.2, and wherein wax mixture contains 0.02 to 0.8 percent of component (a) and 0.1 to 2 percent of component (b), the percents being relative to the weight of the composition, said (a) denotes a first mixture of about 20 to 95%, relative to the weight of the mixture, of an ester of a $C_{10-45}$-aliphatic carboxylic acid and a diol, and about 5 to 80%, relative to the weight of said first mixture, of an alkali metal or alkaline earth metal salt of a $C_{10-45}$ aliphatic carboxylic acids, and said (b) denotes at least one member selected from the group consisting of fatty acid ester, fatty acid amide, fatty acid ester amide and polyethylene wax.

* * * * *